United States Patent
Kaku et al.

(10) Patent No.: US 7,746,748 B2
(45) Date of Patent: Jun. 29, 2010

(54) OPTICAL DISC DEVICE AND REPRODUCTION METHOD

(75) Inventors: Toshimitsu Kaku, Sagamihara (JP); Kazuhide Hamada, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 383 days.

(21) Appl. No.: 11/947,974

(22) Filed: Nov. 30, 2007

(65) Prior Publication Data

US 2008/0253238 A1    Oct. 16, 2008

(30) Foreign Application Priority Data

Apr. 11, 2007    (JP) .............................. 2007-103829

(51) Int. Cl.
G11B 7/00    (2006.01)

(52) U.S. Cl. ................................. 369/53.27; 369/47.49
(58) Field of Classification Search ........................ None
See application file for complete search history.

(56) References Cited

U.S. PATENT DOCUMENTS

| 6,747,924 | B1 * | 6/2004 | Muramatsu | 369/44.29 |
| 7,496,011 | B2 * | 2/2009 | Furukawa et al. | 369/47.5 |
| 2005/0226126 | A1 * | 10/2005 | Abe et al. | 369/121 |

FOREIGN PATENT DOCUMENTS

| JP | 05-089465 | 4/1993 |
| JP | 09-223328 | 8/1997 |

* cited by examiner

*Primary Examiner*—Joseph H Feild
*Assistant Examiner*—Joseph Haley
(74) *Attorney, Agent, or Firm*—Antonelli, Terry, Stout & Kraus, LLP.

(57) ABSTRACT

Due to the axial runout of an optical disc, a frequency of a high-frequency current to be superimposed onto a DC current could not be maintained. In order to solve the problem described above, a drive signal is generated by superimposing a high-frequency signal onto a DC current, the drive signal is applied to a laser beam light source, thereby the light source is driven; and a servo signal at a signal level corresponding to a defocus amount of the laser beam relative to the surface of the optical disc is generated based on a reflected light of the laser beam from the recording surface of the optical disc, and a low-frequency component of the servo signal is extracted, and thereby the frequency of the high-frequency signal to be superimposed onto the DC current in the light source driver is controlled based on the low-frequency component of the servo signal.

8 Claims, 7 Drawing Sheets

OPTICAL DISC DEVICE AND REPRODUCTION METHOD

CROSS-REFERENCES

This application relates to and claims priority from Japanese Patent Application No. 2007-103829, filed on Apr. 11, 2007, the entire disclosure of which is incorporated herein by reference.

BACKGROUND

Conventionally, laser diodes have been used as the light source in an optical disc drive, and laser beams emitted from the laser diodes have been known for their strong coherence. For this reason, in optical disc devices, a high-frequency superimposition method has been used as a method for reducing laser noise caused by the coherence between an outgoing beam from a laser diode and reflected light from an optical disc (see JP5-89465 A).

The high-frequency superimposition method is a method of, in a reproduction mode, producing a driving current in which a high-frequency current is superimposed on a DC current; and driving the laser diode based on the generated drive signal. Since the superimposition of such a high-frequency current can make spectrum of a laser beam turn into a multimode spectrum, the coherence of the laser beam can be reduced, and so laser noise due to reflected light from an optical disc can be reduced.

Furthermore, with respect to the high-frequency superimposition method, it has been known that the relationship between a light path length L between a light emitting point and an optical disc and the frequency F of high-frequency current at which the laser noise becomes lowest (hereinafter referred to as optimal frequency), is expressed in the below formula where c represents the velocity of light:

[Formula 1]

$$f = c/(4 \times 1) \quad (1)$$

This formula (1) corresponds to pulse-driving the laser diode, in which the laser diode is turned off while the reflected light from an optical disc is re-entering the laser diode.

SUMMARY

The present invention relates generally to an optical disc device and a reproduction method, and is suitable for use in an optical disc device compatible with, for example, BD (Blu-ray Disc).

An optical disc device generally causes runout in axial direction, so called axial runout, of an optical disc during rotational driving of the optical disc. Due to this runout, the light path length between the laser diode light emitting point and the optical disc changes periodically.

However, in conventional optical devices, the axial runout of an optical disc has not been considered, and the frequency of a high-frequency current, which is to be superimposed on a DC current, has been fixed to a value determined during the design period so as to be in accordance with formula (1). Therefore, current optical disc devices have a problem of not being able to maintain the frequency of the high-frequency current at an optimal frequency.

Under the above-described circumstances, since a reflected light from an optical disc re-enters an on-state laser diode, laser noise is caused by the coherence between an outgoing beam from the laser diode and reflected light from an optical disc. As a result, the problem of deterioration in the quality of a reproduction signal may arise.

The current invention has been devised in consideration of the above-described points, and offers an optical disc device and reproduction method that are capable of, effectively preventing deterioration in the quality of a reproduction signal in advance.

In order to solve the problem described above, according to an aspect of the invention, an optical disc device that concentrates a laser beam of predetermined power onto a recording surface of an optical disc and reproduces information recorded on the optical disc based on laser beam light reflected from the recording surface of the optical disc includes: a light source driver generating a drive signal by superimposing a high-frequency signal onto a DC current and applying the drive signal to a laser beam light source to drive the light source; and a servo controller that generates a servo signal at a signal level corresponding to the defocus amount of the laser beam relative to the surface of the optical disc based on laser beam light reflected from the recording surface of the optical disc and extracts a low-frequency component of the servo signal to control the frequency of the high-frequency signal to be superimposed onto the DC current in the light source driver based on the low-frequency component of the servo signal.

Furthermore, according to an aspect of the invention, a reproduction method for concentrating a laser beam having a predetermined power onto a recording surface of an optical disc, and reproducing information recorded on the optical disc based on laser beam light reflected from the recording surface of the optical disc, includes: a first step of generating a drive signal by superimposing a high-frequency signal onto a DC current and applying the drive signal to a laser beam light source to drive the light source; and a second step of generating a servo signal at a signal level corresponding to the defocus amount of the laser beam relative to the surface of the optical disc based on laser beam light reflected from the recording surface of the optical disc and extracting a low-frequency component of the servo signal to control the frequency of the high-frequency signal to be superimposed onto the DC current in the light source driver based on the low-frequency component of the servo signal.

Other aspects and advantages of the invention will be apparent from the following description and the appended claims.

DETAILED DESCRIPTION

An embodiment of the invention will be described below with reference to the attached drawings.

(1) Configuration of Optical Disc Device According to Present Embodiment

Figure 1:
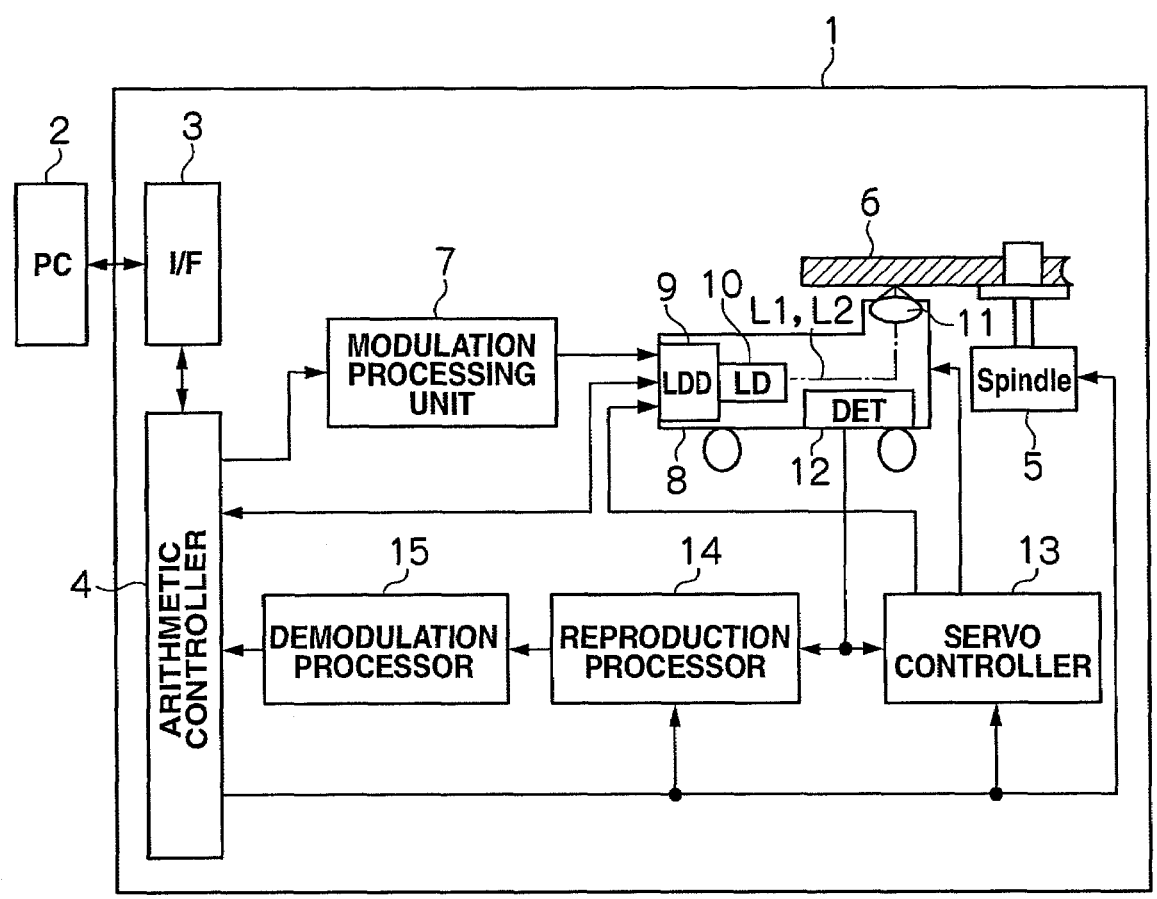
FIG. 1 is a block diagram showing the entire configuration of an optical disc device according to an embodiment of the invention.

In FIG. 1, reference numeral 1 indicates an entire optical disc device according to the embodiment, compatible with, for example, BD. This optical disc device includes an interface unit 3 for communicating with external devices. Various commands from a host computer 2 are input to an arithmetic controller 4 via this interface unit 3.

The arithmetic controller 4 is configured as a microcomputer including a CPU (Computer Processing Unit), a ROM (Read Only Memory) and a RAM (Random Access Memory), and executes required control processing and arithmetic processing based on the commands from the host computer 2 and a control program previously stored in the ROM.

In practice, for example, when receiving a record command from the host computer 2, the arithmetic controller 4 controls the driving of a spindle motor 5 so that a loaded optical disc 6 rotates in a rotary mode suitable for the recording mode of that optical disc 6 (such as CAV (Constant Angular Velocity) mode, CLV (Constant Linear Velocity) mode or ZCLV (Zoned Constant Linear Velocity) mode, etc.).

Also, at the same time, the arithmetic controller 4 performs predetermined signal processing such as adding error-correcting code to write data sent from the host computer 2 along with the recording command, and then sends this write data to a modulation processing unit 7.

The modulation processing unit 7 performs modulation processing for the write data it receives, using a (1, 7) RLL (Run Length Limited) code, a (2, 7) RLL code or a (2, 10) RLL code, and then sends the record data acquired that way to a laser diode driver (LDD: Laser Diode Driver) 9 in an optical pickup 8.

The laser diode driver 9 blinks a laser diode 10 in accordance with the record data it receives. As a result, a laser beam L1 modulated by the drive signal is emitted from the laser diode 10, and the laser beam L1 is concentrated onto the recording surface of the optical disc 6 via an optical system including an objective lens 11 in the optical pickup 8. Consequently, the record data is recorded on the optical disc 6 based on the laser beam L1.

Furthermore, a reflected light L2 of the laser beam L1 from the optical disc 6 is collected on a light-receiving surface of a photodetector 12 via an optical system in the optical pickup 8. Then, the photodetector 12 photoelectrically converts the reflected light L2 incident on the light-receiving surface, and sends an RF (Radio Frequency) signal obtained in that way to a servo controller 13.

The servo controller 13 generates, based on the RF signal it receives, a focus error signal at the signal level corresponding to the shift amount (defocus amount) of the focal position of the laser beam L1 from the recording surface of the optical disc 6, and generates a tracking error signal at the signal level corresponding to the shift amount (off-track amount) of the scanning position of the laser beam L1 from a target track.

Also, the servo controller 13 generates a focus control signal and a tracking control signal based on the above-generated focus error signal and tracking error signal, and sends these signals to a triaxial actuator (not shown in the drawing) supporting the objective lens 11 in the optical pickup 8.

Thus, the triaxial actuator moves, in accordance with these focus control signal and tracking control signal, the objective lens 11 in an axial direction or radical direction as necessary. Consequently, the laser beam L1 just-in-focuses on the recording surface of the optical disc 6, and the focus control and tracking control are performed so that the laser beam L1 scans on a corresponding track.

Meanwhile, when receiving a reproduction command from the host computer 2, the arithmetic controller 4 drives the spindle motor 5 so that the loaded optical disc 6 rotates in a rotation mode suitable for the recording mode for that optical disc 6.

Also, the arithmetic controller 4, in conjunction with the above, controls the laser diode driver 9 in the optical pickup 8 so as to generate a drive signal made by superimposing a high-frequency current onto a DC current of a predetermined level, and applies the drive signal to the laser diode 10. As a result, a laser beam L1 of predetermined power is emitted from the laser diode 10, and the laser beam L1 is concentrated onto the recording surface of the optical disc 6 via the optical system including the objective lens 11 in the optical pickup 8.

The reflected light L2 of the laser beam L1 from the optical disc 6 enters the light-receiving surface of the above-described photodetector 12 via the optical system in the optical pickup 8, and the reflected light L2 is photoelectrically converted in the photodetector 12. Then, an RF signal obtained in this photoelectric conversion is sent to the servo controller 13 and a reproduction processor 14.

The servo controller 13, as is does in the recording mode, generates a focus control signal and a tracking control signal based on the RF signal, and sends these signals to the above-described triaxial actuator in the optical pickup 8. Accordingly, the same focus control and tracking control as that in the recording mode are performed based on the focus control signal and tracking control signal.

Also, the reproduction processor 14 executes, for the RF signal it receives, automatic gain control processing for keeping a signal amplitude constant; waveform equalization processing for correcting an optical spatial frequency degradation; and predetermined reproduction processing such as reduction control processing and binarization processing, etc. Then, it sends the obtained binarization data to a demodulation processor 15.

The demodulation processor 15 performs, for the binarization data it receives, demodulation processing according to the (1, 7) RLL code, (2, 7) RLL code or (2, 10) RLL code, and then sends the obtained demodulation data to the arithmetic controller 4.

The arithmetic controller 4 performs as necessary, for the obtained demodulation data it receives, error-correction processing using a error-correcting code in the demodulation data. Then, it sends the obtained read data to the host computer 2 via the interface unit 3.

(2) High-Frequency Superimposition System According to Present Embodiment

Next, a high-frequency superimposition system employed in the optical disc device 6 according to the present embodiment will be described below.

Figure 2:
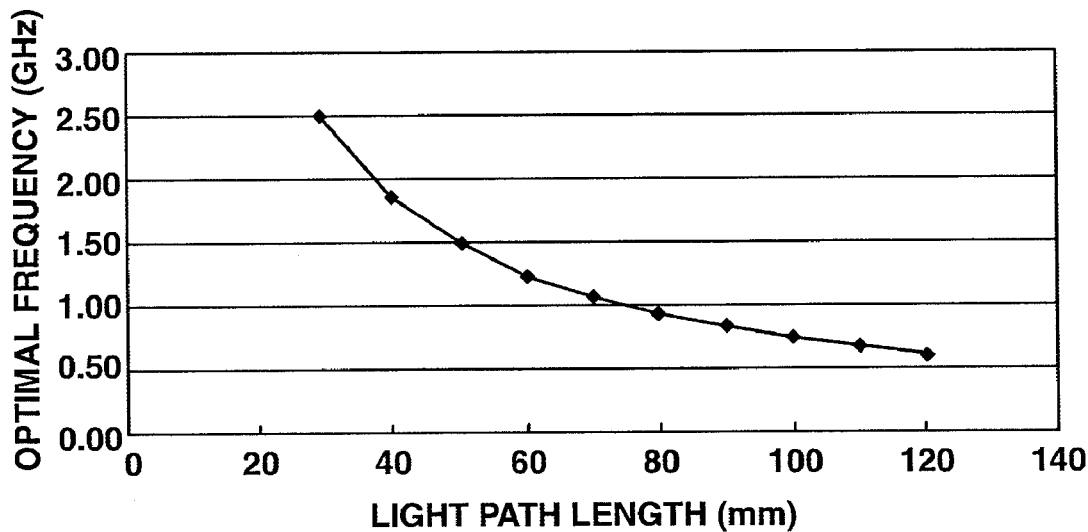
FIG. 2 is a characteristic curve diagram showing the relationship between a light path length and an optimal frequency.
Figure 3:
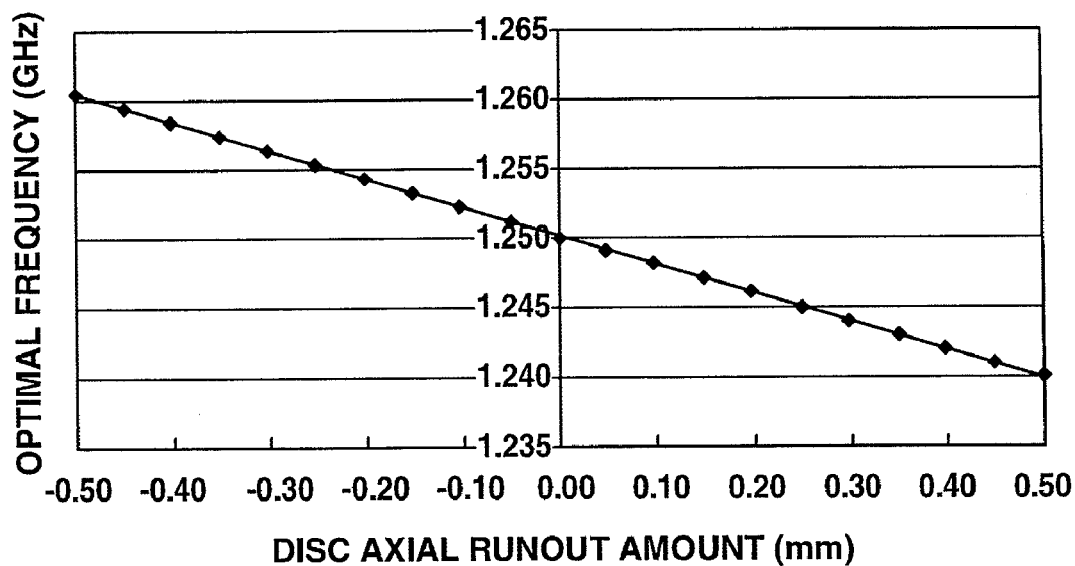
FIG. 3 is a characteristic curve diagram showing the relationship between the axial runout amount of an optical disc and an optimal frequency.

As described above, in the high-frequency superimposition system, the optimal frequency of a high-frequency current to be superimposed on a DC current in the reproduction mode is uniquely determined depending on the light path length from the laser diode 10 light emitting point to the optical disc 6. FIG. 2 shows the relationship between the optimal frequency of a high-frequency current to be superimposed onto that DC current and the light path length. Moreover, in addition to the above-described relationship between the light path length and the optimal frequency, the optimal frequency also changes periodically due to the axial runout of the optical disc 6. FIG. 3 shows the relationship between the axial runout amount (the amount of displacement of the recording surface of the optical disc 6 from a reference position in the axial direction) when the light path length in FIG. 2 is 60 [mm] and the optimal frequency.

One of the characteristic features of the optical disc device 1 according to the present embodiment is that, in order to respond to the changes in the light path length from the laser diode 10 light emitting point to the optical disc 6 due to the axial runout of the optical disc, in reproduction mode, the low-frequency component of a focus control signal including the information for the axial runout amount of the optical disc 6 is extracted in the servo controller 13; and the frequency of the high-frequency current to be superimposed onto the DC current in the laser diode driver 9 is changed based on the extracted low-frequency component of the focus control signal.

Figure 4:
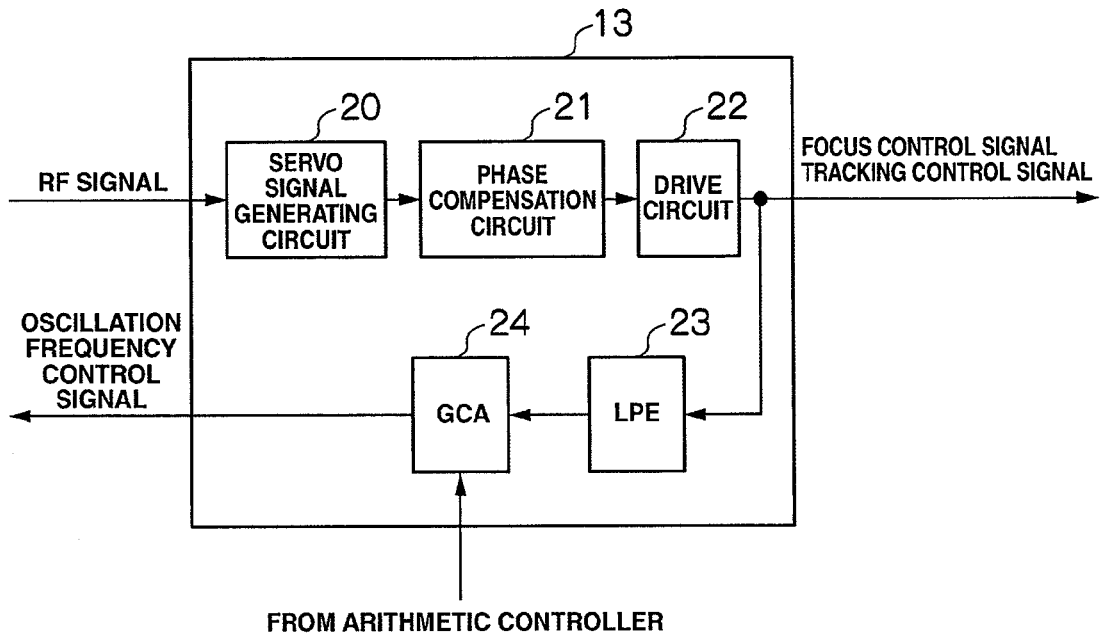
FIG. 4 is a diagram showing the specific configuration of a servo controller.

FIG. 4 shows the specific configuration of the servo controller 13 in the optical disc device 1. As shown in FIG. 4, in the servo controller 13, an RF signal sent from the photodetector 12 in the optical pickup 8 is input to a servo signal generating circuit 20. Then, the servo signal generating circuit 20 generates the above-described focus error signal and tracking error signal based on the RF signal sent from the photodetector 12 in the optical pickup 8 during the reproduction mode, and sends these generated signals to a phase compensation circuit 21.

The phase compensation circuit 21 performs predetermined phase compensation processing in order to stabilize a servo system for the focus error signal and tracking error signal it receives. Then, it sends the post-phase compensation processing focus error signal and tracking error signal to a drive circuit 22, as a phase-compensated focus error signal and a phase-compensated tracking error signal respectively.

The drive circuit 22 generates a focus control signal based on the phase-compensated focus error signal it receives, and generates a tracking control signal based on the phase-compensated tracking error signal it receives. Then, it sends these signals to the triaxial actuator in the optical pickup 8 in the above-described manner. It sends the focus control signal also to a low-pass filter circuit 23 as well.

The low-pass filter circuit 23 extracts the low-frequency component, which includes the basic rotation frequency component of the optical disc 6, from the focus control signal it receives. Then, the low-pass filter circuit 23 sends the extracted low-frequency component to a gain control amplifier (GCA: Gain Control Amplifier) 24.

The gain control amplifier 24 amplifies the focus low-frequency component signal it receives by a gain determined in the LDD/VCO characteristic learning function described below, and then sends the amplified focus low-frequency component signal to the laser diode driver 9 in the optical pickup 8 as an oscillation frequency control signal.

Figure 5:
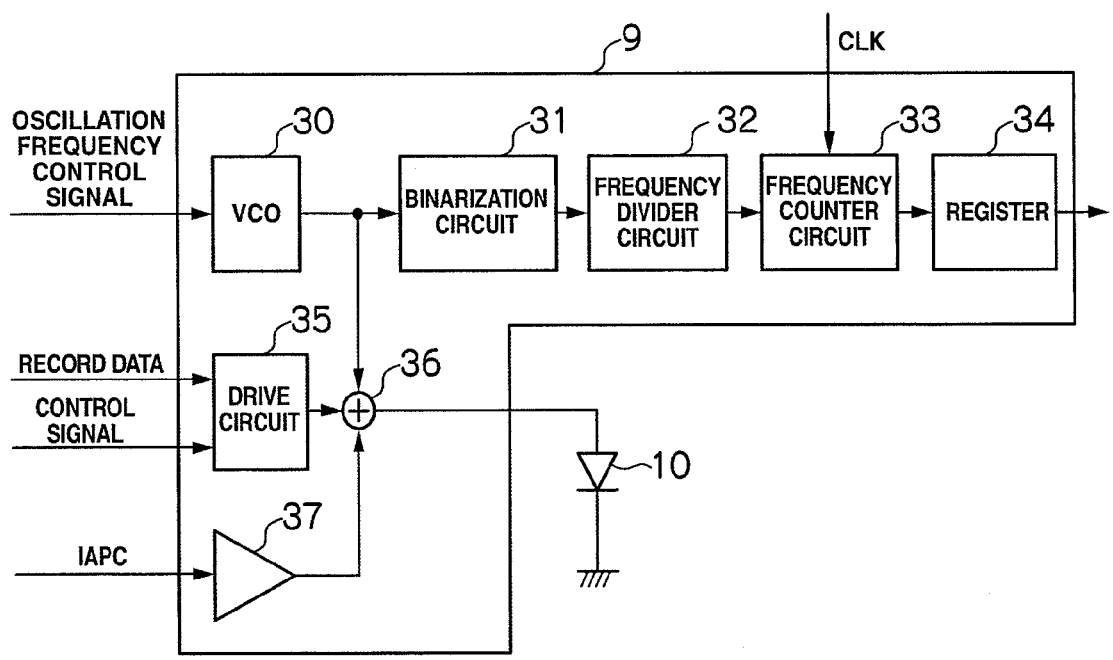
FIG. 5 is a block diagram showing the specific configuration of a laser diode driving unit.

The laser diode driver 9 has a configuration, for example, like that shown in FIG. 5, and inputs the record data it receives from the modulation processing unit 7 and the control signal it receives from the arithmetic controller 4 to the drive circuit 35 during the reproduction mode.

The drive circuit 35 is configured from a current-to-current conversion circuit having, for example, a hundredfold to two-hundredfold gain. The drive circuit 35 generates a drive signal by amplifying the record data it receives using a gain corresponding to the current value of the control signal, and applies the drive signal to the laser diode 10 via an adder circuit 36. Thus, the laser diode 10 blinks based on the drive signal, and the record data is optically recorded on the optical disc 6.

Meanwhile, the laser diode driver 9, in the reproduction mode, inputs an oscillation frequency control signal sent from the servo controller 13 to a voltage controlled oscillator (VCO) 30, which is a high-frequency current source.

Figure 6:
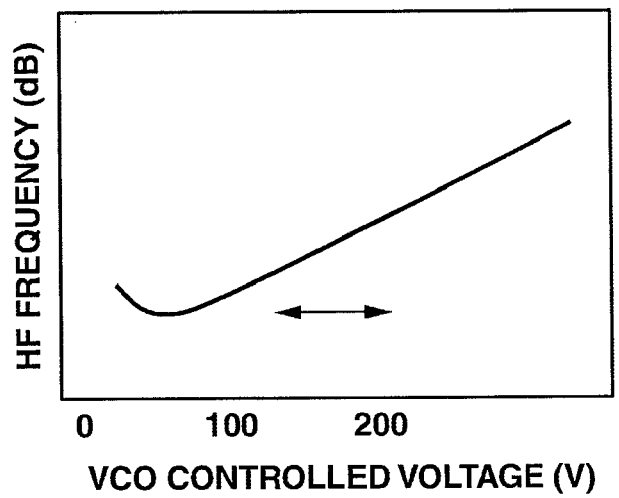
FIG. 6 is a characteristic curve diagram showing the relationship between a VCO control voltage and the frequency of a high-frequency current.

The voltage controlled oscillator 30 has an oscillation characteristic, for example, as shown in FIG. 6, and generates a high-frequency current having a frequency corresponding to the voltage level of the oscillation frequency control signal it receives. Thus, the high-frequency current having a frequency corresponding to the axial runout of the optical disc 6 at that time is generated from the voltage controlled oscillator 30. Then, the voltage controlled oscillator 30 sends the high-frequency current to a binarization circuit 31 and an adder circuit 36.

The binarization circuit 31 binarizes the high-frequency current it receives, and sends a high-frequency digital current acquired that way to a frequency divider circuit 32. Then, the frequency divider circuit 32 generates a pulsed monitor signal of a relatively low frequency by frequency-dividing the high-frequency digital signal, and sends the pulsed monitor signal to a frequency counter circuit 33.

The frequency counter circuit 33 operates based on a reference clock CLK sent from the modulation processing unit 7 (FIG. 1), and measures the frequency of the monitor signal it receives. More specifically, the frequency counter circuit 33 adds up pulse numbers (the number of pulses forming the monitor signal) input from the frequency divider circuit 32 during one cycle of the reference clock CLK. Then, the frequency counter circuit 33 stores the result of the addition of the pulse numbers acquired that way in a register 34. Regarding the result of addition, the register 34 stores the result for at least one rotation period of an optical disc, so that it can be used for the LDD/VCO characteristic learning function described below.

Meanwhile, in the reproduction mode, the adder circuit 36 receives a temperature-compensated DC current having a constant voltage from the arithmetic controller 4 via an amplifier 37. Then, the adder circuit 36 adds up (superimposes) this DC current and a high-frequency current provided from the voltage controlled oscillator 30, and applies the drive signal acquired that way to the laser diode 10 as described above. Consequently, the laser diode 10 lights-up based on this drive signal, and a laser beam of constant power is emitted onto the optical disc 6.

(3) LDD/VCO Characteristic Learning Function

Next, the LDD/VCO characteristic learning function installed in the optical disc device 1 will be described below.

As described above, in the high-frequency superimposition system according to the present embodiment, the frequency of a high-frequency current superimposed onto a DC current is changed based on the low-frequency component of the focus control signal. Consequently, in the optical disc device 1 according to the present embodiment that employs such a high-frequency superimposition system, the voltage controlled oscillator 30 should follow the change of the axial runout amount of the optical disc 6, and generate a high-frequency current having a frequency corresponding to the axial runout amount at that time.

However, the sensitivity of the gain control amplifier 24 (FIG. 4) varies from optical disc device to optical disc device, and not all voltage controlled oscillators 30 in all the optical devices always generate the same frequency for the high-frequency current in accordance with the axial runout of the optical discs 6.

Figure 7:
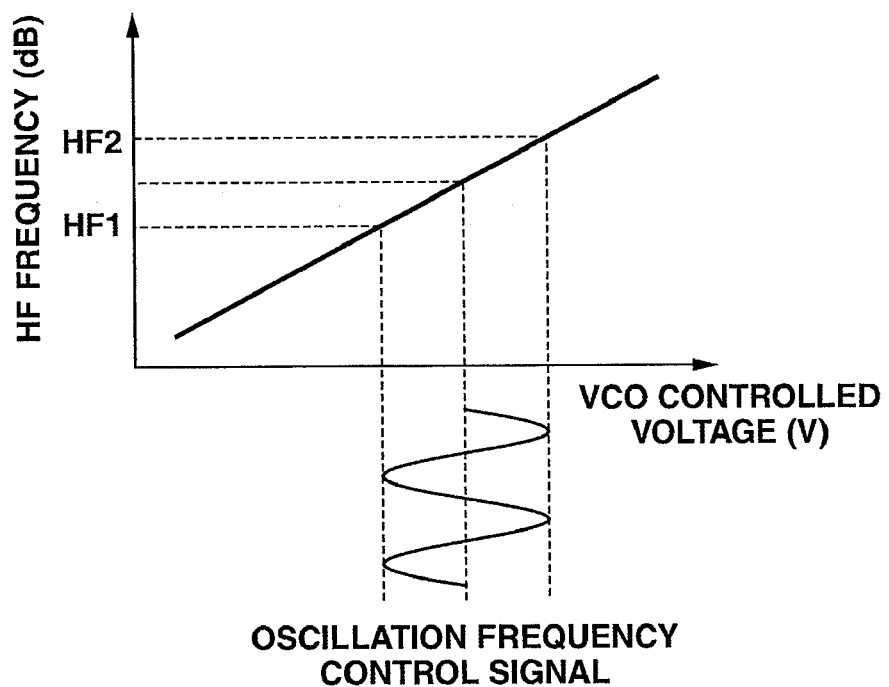
FIG. 7 is a characteristic curve diagram showing the relationship between an oscillation frequency control signal and the frequency of a high-frequency current.

Therefore, as shown in FIG. 7, the optical disc device 1 according to the present embodiment has an LDD/VCO characteristic learning function for automatically adjusting the gain of the gain control amplifier 24, so that the oscillation frequency "f" of the voltage controlled oscillator 30 is kept within a predetermined range (HF1≦f≦HF2) for the axial runout of the optical discs 6 (hereinafter referred to as gain adjustment optical discs) having well-known axial runout widths (width of runout in axial direction of the optical disc 6).

Furthermore, in FIG. 7, HF1 and HF2 respectively indicate the minimum oscillation frequencies for the voltage controlled oscillator 30 and the maximum oscillation frequency of the voltage controlled oscillator 30, which are expected when reproducing a gain adjustment optical disc 6. More specifically, when the axial runout amount of the gain adjustment optical disc is ±0.25 [mm], the oscillation frequency expected for the voltage controlled oscillator 30 is 1.25 [GHz] ±5 [MHz], therefore, HF1 and HF2 at that time are 1.245 [GHz] and 1.255 [GHz], respectively.

Figure 8:
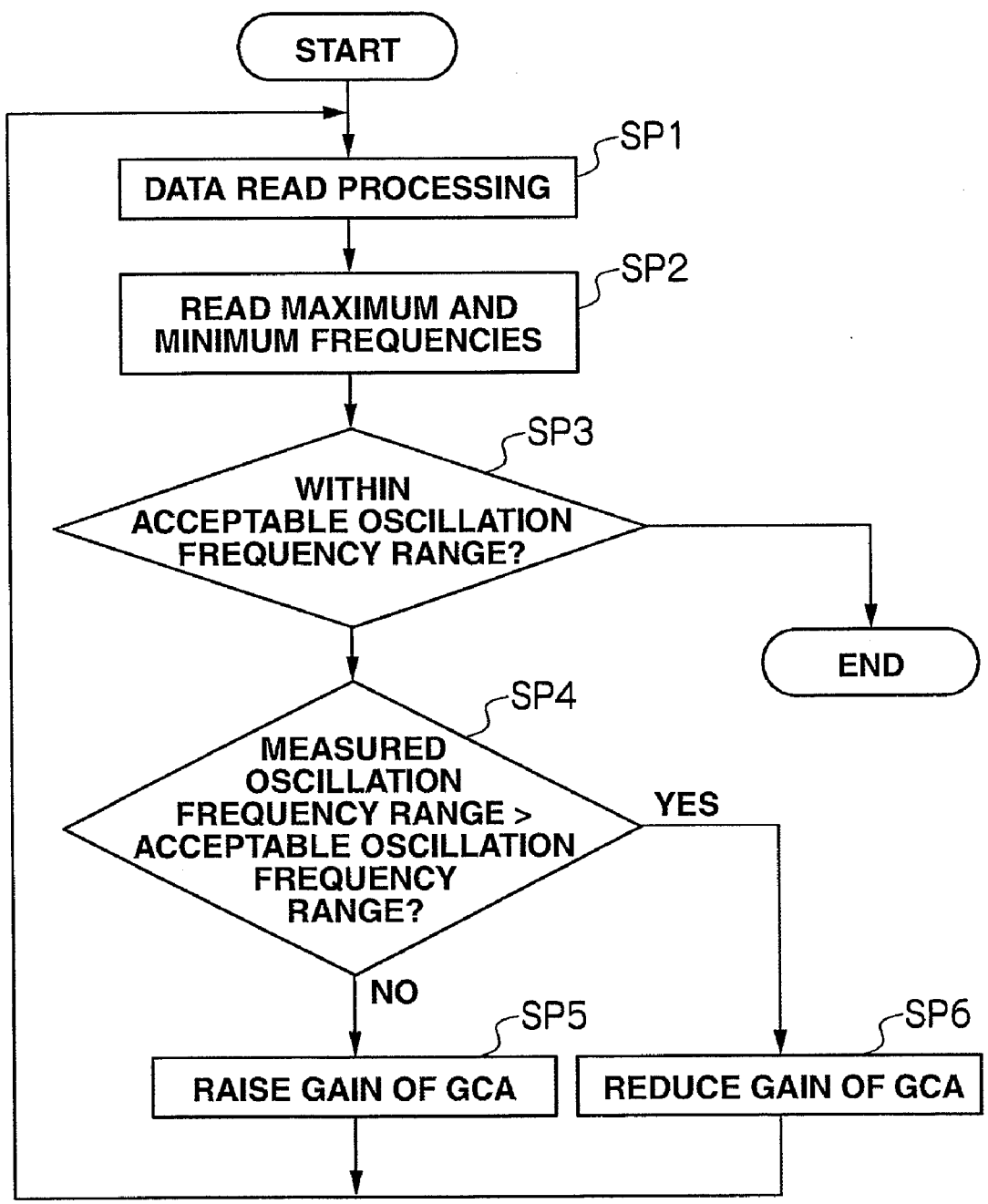
FIG. 8 is a flowchart illustrating LDD/VCO characteristic learning processing.

FIG. 8 shows the specific content of the processing performed by the arithmetic controller 4 according to the LDD/VCO characteristic learning function. When a command to perform the LDD/VCO characteristic learning processing (hereinafter referred to as an LDD/VCO characteristic learning processing execution command) is provided by the host computer 2 in accordance with user operation, the arithmetic controller 4 starts the LDD/VCO characteristic learning processing by changing the operation mode to LDD/VCO characteristic learning mode. First, it performs reproduction processing for reproducing data from a gain adjustment optical disc 6 (SP1).

Following the above, the arithmetic controller 4 searches the register 34 (FIG. 5) in the laser diode driver 9 for the maximum value (hereinafter referred to as measured maximum frequency) and minimum value (hereinafter referred to as measured minimum frequency) of the frequency of high-frequency currents, and reads out these values (SP2).

Then, the arithmetic controller 4 judges whether or not the range extending from the measured maximum frequency to the measured minimum frequency (hereinafter referred to as measured oscillation frequency range) retrieved from the register 34 in step SP2 is within an acceptable range (hereinafter referred to as acceptable oscillation frequency range) for the oscillation frequency generated by the voltage controlled oscillator 30, which is determined in advance so as to include both HF1 and HF2 in FIG. 7 (SP3).

When a negative result is obtained in this judgment, the arithmetic controller 4 judges whether or not the measured oscillation frequency range exceeds the acceptable oscillation frequency range (in other words, whether or not the measured maximum frequency is larger than the maximum value in the acceptable oscillation frequency range) (SP4). Then, the arithmetic controller 4 controls the gain control amplifier 24 so that the gain control amplifier raises the gain when a negative result is obtained in this judgment (SP5); or reduces it when a positive result is obtained in this judgment (SP6).

Next, the arithmetic controller 4 repeats the same steps (SP1-SP6-SP1), and when a positive result is finally obtained in step 3, it terminates this LDD/VCO characteristic learning processing.

(4) Advantageous Effects of Present Embodiment

As described above, in the optical disc device 1 according to the present embodiment, because the oscillation frequency of the voltage controlled oscillator 30 in the laser diode driver 9 is controlled in accordance with the low-frequency component of the tracking error signal (tracking control signal), it is always possible to superimpose, on the DC current, a high-frequency current with the frequency constantly optimal for the distance between the laser diode 10 light emitting point and the optical disc 6, which changes according to the axial runout of the optical disc 6. Consequently, laser noise due to the coherence between an outgoing beam from the laser diode 10 and reflected light from the optical disc 6 can be reduced, and deterioration in the quality of a reproduction signal can be effectively prevented in advance.

(5) Another Embodiment of the Invention

In the foregoing embodiment, the case where the invention is applied to the BD-compatible optical disc device 1 is described. However, the invention is not limited to this example, and is capable of being applied in other various optical disc devices compatible with different kinds of optical discs other than BD.

Also in the foregoing embodiment, the case where, in the LDD/VCO characteristic learning mode, the output of the gain control amplifier 24 is applied to the voltage controlled oscillator 30 and the gain of the gain control amplifier 24 is adjusted in accordance with the oscillation frequency of the voltage controlled oscillator 30 at that time is described. It is limited to this example, however, and other various adjustment means can be employed in the invention, as means for adjusting the gain of the gain control amplifier 24.

For example, the gain of the gain control amplifier 24 may be adjusted by means of, without directly applying the output of the gain control amplifier 24 when reproducing the forgoing gain adjustment optical disc to the voltage controlled oscillator 30, but storing the maximum value and the minimum value of the output of the gain control amplifier 24 at that time in the gain control amplifier 24; applying only these maximum and minimum values of the output of the gain control amplifier 24 to the voltage controlled oscillator 30; and controlling the gain of the gain control amplifier 24 based on the oscillation frequency of the voltage controlled oscillator 30 at that time.

Figure 9:
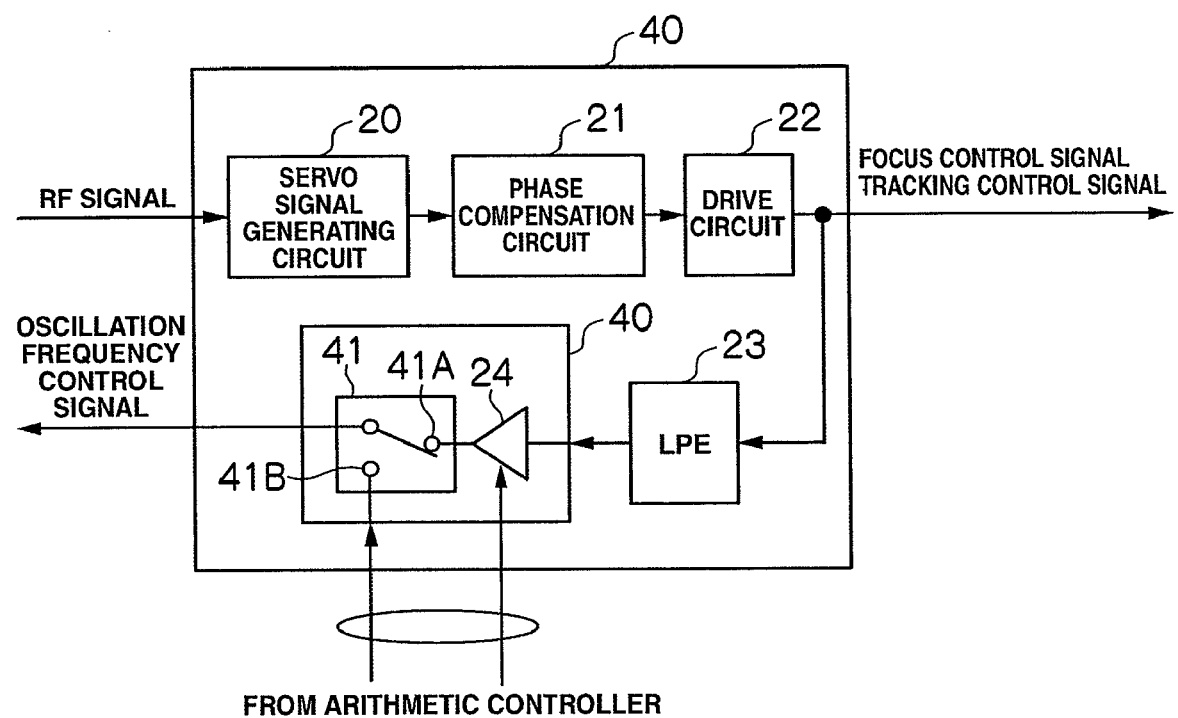
FIG. 9 is a block diagram showing the configuration of a servo controller according to another embodiment of the invention.

Furthermore, as described in the foregoing embodiment, the servo controller 13 is configured as shown in FIG. 4, however, in the invention, the configuration of the servo controller 13 is not limited to this example, and the servo controller 13 may be configured, for example, as shown in FIG. 9, where parts corresponding to those in FIG. 4 have the same reference numerals.

The servo controller 40 shown in FIG. 9 differs from the servo controller 13 in FIG. 4 in having a gain control amplifier 40 consisting of the gain control amplifier 24 and a switch circuit 41, in place of the gain control amplifier 24. With a servo controller having this configuration, when the connection terminal inside the switch circuit 41 is connected to a first switch end 41A, the same LDD/VCO characteristic learning processing as that in the foregoing embodiment can be performed; and when the connection terminal inside the switching circuit 41 is connected to a second switch end 41B and the maximum value and the minimum value of the oscillation frequency control signal, which are expected to be acquired when reproducing the gain adjustment optical disc 6, are applied from the arithmetic controller 4 to the second switch end, the same LDD/VCO characteristic learning processing as that in the foregoing embodiment can be performed without using the gain adjustment optical disc 6.

Figure 10:
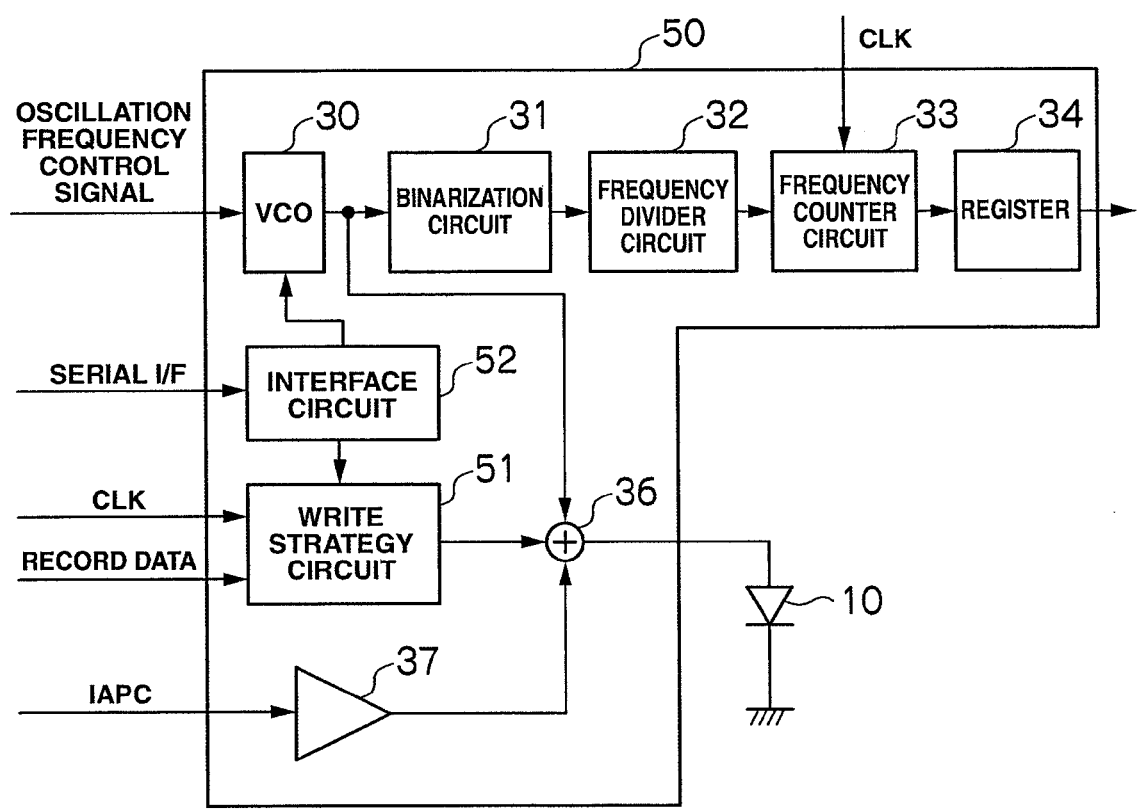
FIG. 10 is a block diagram showing the configuration of a laser diode driver according to another embodiment of the invention.

Moreover, as described in the foregoing embodiment, the laser diode driver 9, as a light source driver, is configured as shown in FIG. 5, however, in the invention, the configuration of the laser diode driver 9 is not limited to this example, and the laser diode driver 9 may be configured as, for example, shown in FIG. 10, where parts corresponding to those in FIG. 5 have the same reference numerals.

The laser diode driver 50 shown in this FIG. 10 differs from the laser diode driver 9 in FIG. 5 in having a write strategy circuit 51 and an interface circuit 52, in place of the drive circuit 35 (FIG. 5).

The write strategy circuit 51 is a circuit for performing multi-pulse modulation processing for record data sent from the modulation processing unit 7 based on a clock also sent from the relevant modulation processing unit 7. Also, the interface circuit 52 is a circuit serving, not only as an interface for the arithmetic controller 4, but also as a register for storing data, such as strategy execution time information and power information for multi-pulse processing performed in the strategy circuit 52. In addition, the interface circuit 52 contains a digital/analog circuit, so that the arithmetic controller 4 can apply the oscillation frequency control signal expected to be acquired when reproducing the gain adjustment optical disc to the voltage controlled oscillator 30 via interface circuit 52. Thus, with the laser diode driver 50 having a configuration like the above, the same LDD/VCO characteristic learning processing as that in the foregoing embodiment can be performed even when an oscillation frequency control signal cannot be obtained from the servo controller 13; accordingly, for example, it is possible to have the optical disc device 1 automatically perform factory-set LDD/VCO characteristic learning processing at a predetermined time, such as when the optical disc device 1 is powered-on.

According to the invention, even when an axial runout occurs on an optical disc, the frequency of a high-frequency signal to be superimposed on a DC current can be maintained at an optimal frequency at all times, so laser noise due to the coherence between an outgoing beam from a laser diode and reflected light from an optical disc can be prevented. Consequently, an optical disc device and a reproduction method that are capable of effectively preventing deterioration in the quality of a reproduction signal in advance can be achieved.

What is claimed is:

1. An optical disc device concentrating a laser beam of predetermined power on a recording surface of an optical disc, and reproducing information recorded on the optical disc based on laser beam light reflected from the recording surface of the optical disc, comprising:
a light source driver generating a drive signal by superimposing a high-frequency signal onto a DC current, and applying the drive signal to a laser beam light source, thereby driving the light source; and
a servo controller generating a servo signal at a signal level corresponding to a defocus amount of the laser beam relative to the surface of the optical disc based on laser beam light reflected from the recording surface of the optical disc, extracting a low-frequency component of the servo signal, and thereby controlling the frequency of the high-frequency signal to be superimposed onto the DC current in the light source driver based on the low-frequency component of the servo signal.

2. The optical disc device according to claim 1, wherein the light source driver includes an oscillator generating a high-frequency signal of the frequency corresponding to a signal level of the low-frequency component of the servo signal, and
the servo controller applies the extracted low-frequency component of the servo signal to the oscillator in the light source driver.

3. The optical disc device according to claim 2, wherein the light source driver includes a frequency counter measuring the frequency of the high-frequency signal output from the oscillator, and
the servo controller includes a gain-adjustable amplifier amplifying the extracted low-frequency component of the servo signal; and a controller for adjusting the gain of the amplifier in the servo controller in order to keep the frequency of the high-frequency signal measured by the frequency counter within a predetermined range when reproducing an adjustment optical disc of known axial runout amount.

4. The optical disc device according to claim 2, wherein the light source driver includes a frequency counter measuring the frequency of the high-frequency signal output from the oscillator, and
the servo controller includes a gain-adjustable amplifier amplifying the extracted low-frequency component of the servo signal; and a controller applying a maximum voltage and a minimum voltage of the low-frequency component of the servo signal, which are expected to be obtained when reproducing an adjustment optical disc of known axial runout amount, to the oscillator and adjusting the gain of the amplifier in the servo controller in order to keep the frequency of the high-frequency signal at the time of the above application measured by the frequency counter within a predetermined range.

5. A reproduction method for concentrating a laser beam of predetermined power on a recording surface of an optical disc, and reproducing information recorded on the optical disc based on laser beam light reflected from the recording surface of the optical disc, comprising:
a first step of generating a drive signal by superimposing a high-frequency signal onto a DC current and applying the drive signal to a laser beam light source, thereby driving the light source;
a second step of generating a servo signal at a signal level corresponding to a defocus amount of the laser beam relative to the surface of the optical disc based on laser beam light reflected from the recording surface of the optical disc and extracting a low-frequency component of the servo signal, thereby controlling the frequency of the high-frequency signal to be superimposed onto the DC current in the light source driver based on the low-frequency component of the servo signal.

6. The reproduction method according to claim 5, wherein:
in the first step, a high-frequency signal of the frequency corresponding to a signal level of the low-frequency component of the servo signal is generated; and
in the second step, the extracted low-frequency component of the servo signal is applied to the oscillator.

7. The reproduction method according to claim 6, wherein:
in the second step, the extracted low-frequency component of the servo signal is amplified and applied to the oscillator; and
before the first step, the gain when amplifying the low-frequency component of the servo signal in the second step is adjusted so that the frequency of the high-frequency signal when reproducing a predetermined optical disc of known axial runout is kept within a predetermined range.

8. The reproduction method according to claim 6, wherein:

in the second step, the extracted low-frequency component of the servo signal is amplified and applied to the oscillator; and before the first step, the gain when amplifying the low-frequency component of the servo signal in the second step is adjusted so that the frequency of the high-frequency signal when applying a maximum voltage and a minimum voltage of the low-frequency component of the servo signal expected to be obtained when reproducing an adjustment optical disc of known axial runout amount is kept within a predetermined range.

* * * * *